Figure 5:
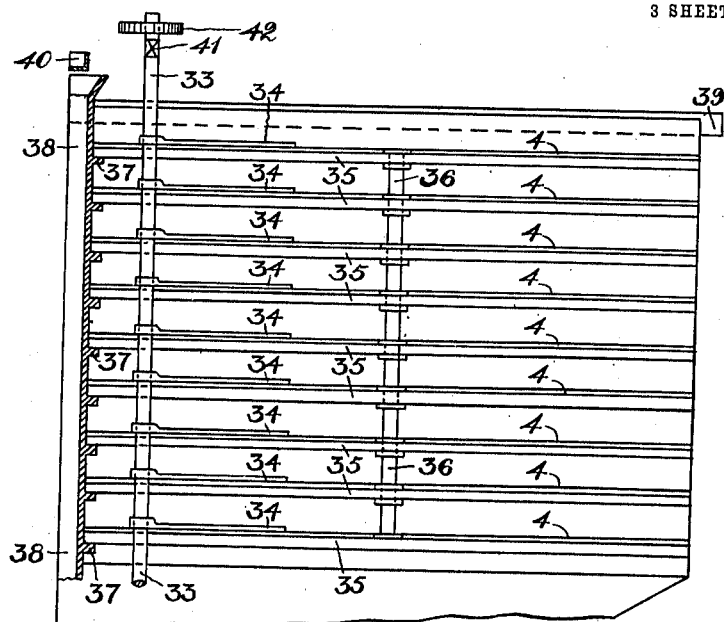

A. J. ARBUCKLE.
MEANS FOR SEPARATING PULVERIZED ORE OR OTHER COMMINUTED SOLID MATTER FROM LIQUID.
APPLICATION FILED OCT. 30, 1909.
988,535.
Patented Apr. 4, 1911.
3 SHEETS—SHEET 1.
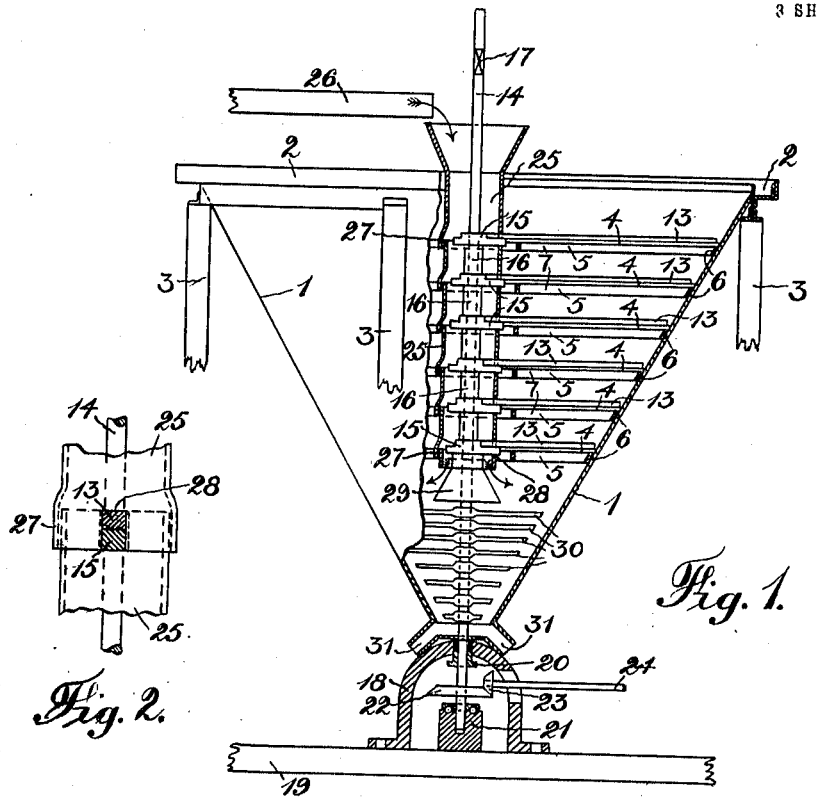
Fig. 1.
Fig. 2.
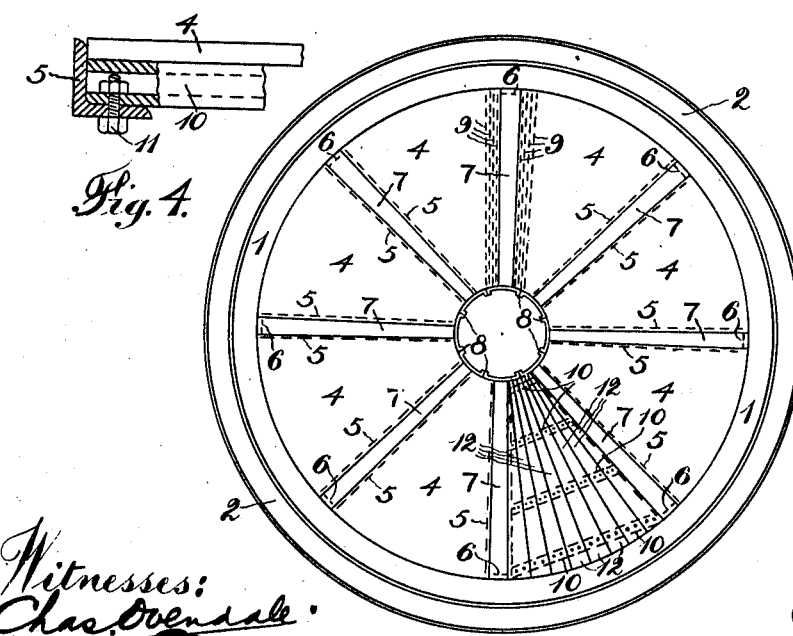
Fig. 4.
Fig. 3.
Witnesses:
Chas. Ovendale
W. S. Aves
Inventor:
Alexander John Arbuckle A. J. ARBUCKLE.
MEANS FOR SEPARATING PULVERIZED ORE OR OTHER COMMINUTED SOLID MATTER FROM LIQUID.
APPLICATION FILED OCT. 30, 1909.

988,535.

Patented Apr. 4, 1911.

3 SHEETS—SHEET 2.

Witnesses:

Inventor:
Alexander John Arbuckle

A. J. ARBUCKLE.
MEANS FOR SEPARATING PULVERIZED ORE OR OTHER COMMINUTED SOLID MATTER FROM LIQUID.
APPLICATION FILED OCT. 30, 1909.

988,535.

Patented Apr. 4, 1911.

3 SHEETS—SHEET 3.

Witnesses:
Chas. Ovendale
A. Thompson

Inventor:
Alexander John Arbuckle

UNITED STATES PATENT OFFICE.

ALEXANDER JOHN ARBUCKLE, OF JOHANNESBURG, TRANSVAAL.

MEANS FOR SEPARATING PULVERIZED ORE OR OTHER COMMINUTED SOLID MATTER FROM LIQUID.

988,535.  Specification of Letters Patent.  Patented Apr. 4, 1911.

Application filed October 30, 1909. Serial No. 525,530.

*To all whom it may concern:*

Be it known that I, ALEXANDER JOHN ARBUCKLE, a subject of the King of Great Britain, and resident of Johannesburg, Transvaal, have invented certain new and useful Improvements in Means for Separating Pulverized Ore or other Comminuted Solid Matter from Liquid, of which the following is a specification.

This invention relates to means for separating pulverized ore or other comminuted solid matter from liquid. It is more particularly intended for separating the solid constituent of "slimes"—the minute particles of pulverized ore—from water, solvent solution or other liquid.

The object of the invention is to accelerate the deposition or settlement of said solid constituent of the ore pulp, or other mixture of comminuted solid matter and liquid.

For the carrying out of my invention I employ a tank, vat or vessel in which the separation of the solid matter from the liquid is effected. This vessel may take the form of an inverted conical, inverted pyramidical, cylindrical or other suitably shaped tank. If the vessel is cylindrical, or constructed with vertical sides, then it is preferably provided with an inverted conical, pyramidical or other suitably shaped bottom or lower portion converging to a preferably central outlet for the solids. This vessel may be equipped around the top with a rim launder for receiving the more or less clear overflowing liquid. The pulp or mixture of comminuted solid matter and liquid is introduced by suitable means preferably into the lower portion of the vessel.

In the vessel, and preferably above the point or points at which the pulp or mixture is introduced, I arrange a suitable member of super-positioned plates or flat surfaces to provide a large area upon which the particles of ore or other solid matter can settle. These plates or surfaces may be arranged at any equal or unequal distances apart, say at a greater distance in the upper portion of the vessel and at a lesser distance in the lower portion thereof, where most of the comminuted ore or solid particles will probably settle or be deposited. These plates or surfaces are by preference disposed horizontally, although they may, if preferred, be arranged at any suitable inclination.

In each plate or surface, or between contiguous plates or surfaces of each tier, one or more slots, holes or passages are provided; the slots, holes or passages in all the tiers preferably coincide, so that an unobstructed passage for the settled solids is provided from the top to the bottom of the vessel. The slots, holes or passages in the several tiers preferably gradually increase in width in each succeeding tier from the top to the bottom of the vessel. Each slot, hole or passage also preferably gradually increases in width from the center to the side of the vessel. Means are provided for scraping or removing the settled solids off the plates or surfaces, and delivering the same over the slots, holes or passages, through which they fall to the bottom of the vessel.

The invention will be more fully described by aid of the accompanying drawings, in which—

Figure 6:
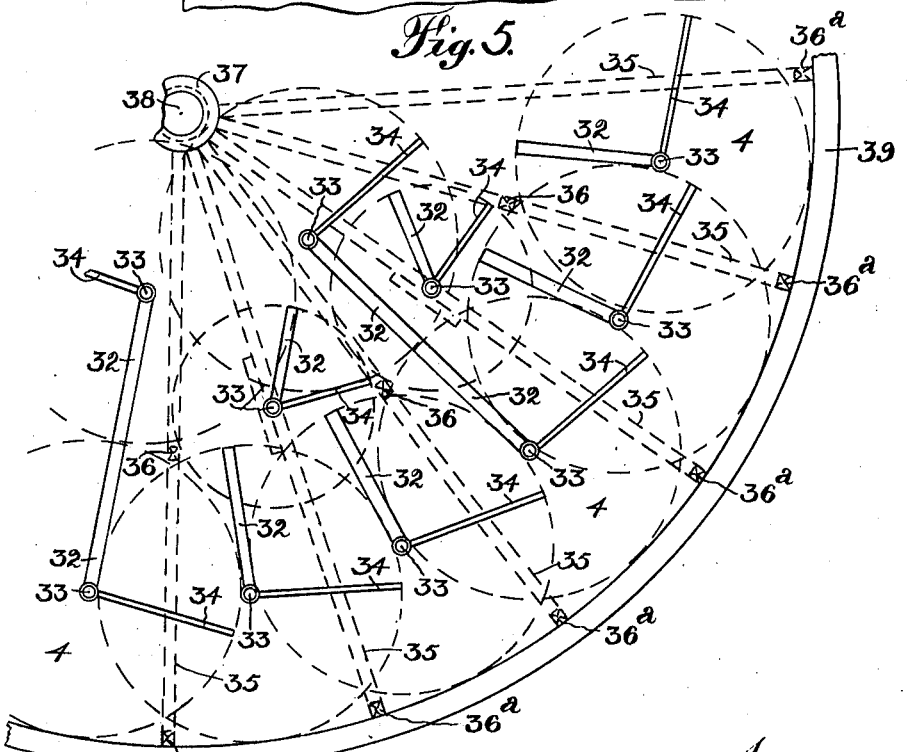
Figure 7:
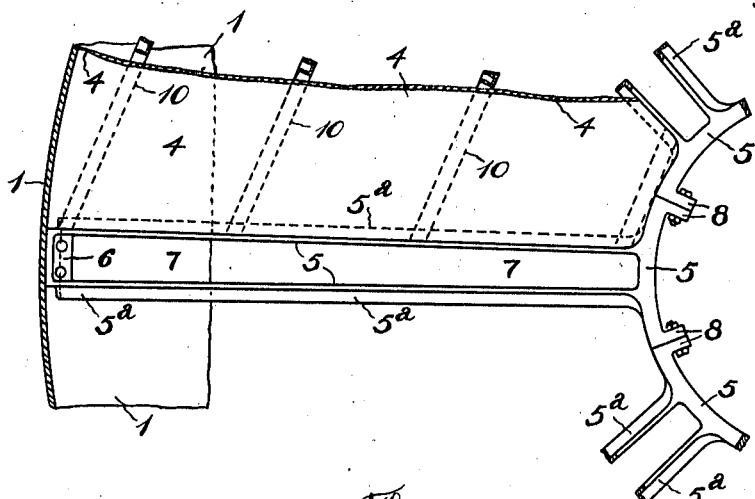
Figure 8:
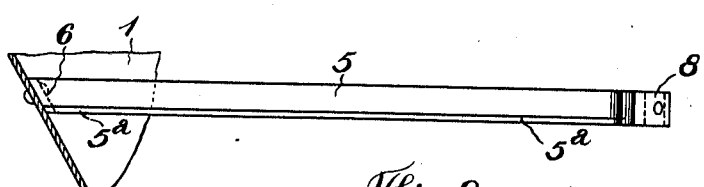
Figure 9:
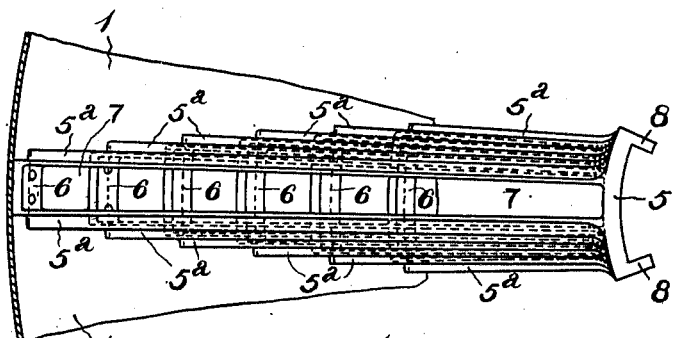

Figure 1 represents a part sectional elevation of a conical settling vessel with the invention applied thereto. Fig. 2 is a view of a portion of the vertical feed pipe 25 showing the open-ended slots 28 provided in the ends of the telescopic sections thereof for the scraper arms 13. Fig. 3 is a plan of the vessel showing one arrangement of carrier frames 5 for supporting the horizontal settling plates 4. Fig. 4 is a detail of a portion of one of the carrier frames 5 and channel irons 10 supporting the settling plates 4. Fig. 5 is a sectional elevation of a portion of a cylindrical settling vessel, provided with the settling plates, with certain parts removed. Fig. 6 is a plan of a portion of the cylindrical settling vessel of which a part is shown in Fig. 5. Fig. 7 is a fragmentary plan view, drawn to an enlarged scale, illustrating the form and arrangement of the carrier frames 5, the channel irons 10 and the settling plates 4 inside the settling vessel 1. Fig. 8 is a side elevation of one of the carrier frames 5 and a portion of the vessel 1 to which it is fixed, and Fig. 9 is a fragmentary plan view, also drawn to an enlarged scale, illustrating the construction and arrangement of the carrier frames 5 in such a way that the slots or passages 7 are increased in width in each succeeding carrier from the top to the bottom of the vessel 1.

In Figs. 1 to 4 and 7 to 9, the invention is shown applied to an ordinary conical settling vessel of comparatively small capacity. In these figures, 1 represents the inverted conical settling vessel, which is shown provided at the top with an annular overflow or rim launder 2. The tank 1 is carried by means of posts or uprights 3. Inside the vessel 1, and shown arranged at more or less equal vertical distances apart, are provided the super-positioned horizontal settling plates 4. The plates 4 of each tier are carried by a suitable number of preferably radial carriers 5. The carriers 5 are riveted or otherwise suitably fixed at their outer ends, as indicated at 6, to the inside of the tank 1, and they are preferably constructed at the sides of L section, as shown in Figs 3, 4 and 7 to 9. The horizontal web or portion 5$^a$ of the L or angle piece is cut away or not provided beyond the point 6, where the carrier is riveted to the vessel 1, and as shown in Figs. 1 and 7 to 9, the end of the carrier is bent or shaped at that point to fit the inside of the cone. Between the sides of the carriers, radial slots or passages 7 are provided, which coincide in the several tiers, and, as shown, preferably gradually increase in width from the inner to the outer ends of the carriers 5. The width of the slots or passages 7 may be increased in each succeeding carrier from the top to the bottom of the vessel 1 as indicated by the dotted lines 9 in Fig. 3, and in Fig. 9. The inner ends of the carriers are constructed with lugs of projections 8 for riveting or otherwise connecting the several carriers of the same tier or supporting the plates lying in the same plane—see Figs. 3 and 7 to 9. When the several carriers are assembled, their inner ends, as shown in Fig. 3, form a complete ring so that said connected inner ends of the several carriers mutually support each other. For carrying the plates 4 between the carriers 5, a suitable number of horizontal cross-pieces 10, of channel or other suitable section, of iron, or other suitable material, may, as shown in connection with Figs. 3 and 4, be arranged between adjacent carriers, and be bolted, riveted or otherwise suitably secured at the ends, as indicated at 11 in Fig. 4, to the sides of the carriers 5. The plates 4, which may be made of metal, fit between adjacent carriers as shown in Fig. 3. The upper surfaces of the plates 4 are preferably level with the top of the carriers 5 as shown in Fig. 4.

Instead of using metal plates to provide the settling surfaces 4, said surfaces may be provided by suitably shaped pieces of wood, as indicated at 12 in Fig. 3. In this case the planks or pieces of wood 12 will be bolted, riveted or otherwise secured to the channel iron or other suitable cross-pieces 10. As previously explained in connection with the metal plates 4, the upper surface of the planks 12 should preferably be level with the top of the carrier frames 5. In the case of tanks or vessels of small capacity, it will probably be found most convenient to employ metal plates for the settling surfaces 4, but in the case of large tanks, in order to prevent excessive weight inside the tanks, said settling surfaces may be conveniently constructed of wood, as hereinbefore described.

For the purpose of conveying the particles of solid matter, which settle and accumulate upon the plates 4, to the slots or passages 7, scraper arms 13 are provided. The scraper arms 13 are attached to a vertical shaft 14 by means of bosses or hub members 15. The bosses or hub members 15 are shown maintained the correct distance apart upon shaft 14 by means of tubular distance pieces 16 placed around the shaft between said members 15. Said members 15 may be keyed or otherwise suitably fixed to shaft 14. One, two or more of the scraper arms 13 may be fixed to each hub member. A hub member 15 is provided on the shaft for each tier of settling plates, and said members are so disposed upon and fixed to the shaft 14, that the scraper arms pass close to the settling surfaces as the shaft 14 is rotated. The scraper arms 13 extend to the outer edge of the settling plates 4, and they serve, as they are rotated, to scrape the solid matter off said surfaces 4 and deliver it over the slots or passages 7 through which it falls to the bottom of the vessel. The shaft 14 at its upper extremity runs in a bearing 17, and at its lower extremity in a bearing 18 beneath the bottom of the tank 1. Bearing 18 may be bolted or otherwise suitably fixed to a timber or other suitable foundation member 19.

20 represents a gland for bearing 18, and 21 a footstep bearing in which the lower extremity of shaft 14 is rotatably supported.

22 is a bevel wheel on shaft 14, and 23 another bevel wheel (meshing bevel wheel 22) on driving shaft 24. Rotary motion is imparted to shaft 24, and said motion transmitted to shaft 14 through bevel wheels 22, 23.

Inside the vessel 1 and surrounding a portion of the driving shaft 14 is a vertical feed pipe 25. This pipe at its upper extremity is made of funnel shape, and into it the pulp or mixture of solids and liquid is delivered by launder or pipe 26. The feed pipe 25 is, as shown in Figs. 1 and 2, preferably constructed of a number of telescopic sections, the lower end of each section being enlarged, as indicated at 27 in Fig. 2, to receive the upper end of the next succeeding lower section. Open-ended slots 28 are formed in the upper and lower ends of the several telescopic sections of the feed pipe 25, through which slots the scraper arms 13, attached to the hub members 15, project. To the shaft 14, at the bottom of the feed pipe 25, is fixed a deflecting cone 29, which serves for diverting the inflowing pulp or mixture to the sides of the vessel 1, as indicated by the arrows in Fig. 1.

As will be understood from the foregoing description, feed pipe 25 and distributing cone 29 rotate with shaft 14 when the latter is rotated to revolve the scraper arms 13. To the vertical shaft 14, below the settling plates, is fixed a plurality of helically disposed radial blades or arms 30, which operate to deliver the solids, which settle at the bottom of the vessel, through the outlets 31 provided in the bottom thereof.

In the operation of this apparatus, the pulp is delivered by launder or pipe 26, into the funnel shaped upper end of feed pipe 25. It then falls to the bottom of the latter and is deflected by cone 29 toward the sides of the vessel. The heavier particles of the solid constituent of the pulp immediately fall to the bottom of the vessel 1. The lighter particles, which are carried up through the slots 7 by the uprising liquid on its way to the overflowing launder 2 settle and accumulate upon the settling surfaces 4, and are scraped off said surfaces and delivered over the slots or passages 7 by the rotating arms 13. As the slots or passages 7 in each tier of settling plates 4 coincide, as previously explained, unobstructed passages are thereby provided, down which the solids once they have been collected fall with little diffusion through the uprising current to the bottom of the vessel 1. The solids which fall to, and accumulate at, the bottom of the vessel, are forced through the outlets 31 in the form of a very thick pulp by the spirally disposed arms or blades 30.

In Figs. 5 and 6, I illustrate the invention adapted to a larger tank or vessel. In this case, the settling plates 4 are provided with an increased number of suitably positioned elongated holes or slots 32. The slots 32 in the several tiers of plates 4 coincide, as has previously been explained in connection with Figs. 1 to 4, and they are also preferably increased in width in each succeeding tier from the top to the bottom of the vessel, as before described. A number of vertical shafts or spindles 33—one of which is shown in Fig. 5—is provided, suitably arranged and supported in relation to the slots 32, and passing through all the plates. Upon spindles 33 are fixed scraper arms 34, which operate to scrape the solids off plates 4, and to deliver the same over the slots 32. The spindles 33 are shown arranged in the form of concentric circles, and so disposed relative to each other that the paths of adjacent scrapers overlap. The settling plates 4 are carried by radial beams 35, which latter may be supported at their extremities, and by means of suitable standards or supports 36 at any intermediate point or points.

The inner ends of the beams 35 are shown carried by flanges or projections 37 on a central vertical feed pipe 38, and the outer ends by supports 36ª. The tank is shown of cylindrical shape in its upper portion and of inverted conical shape in its lower portion. 39 is the rim launder, for receiving the overflowing clear liquid, and 40 the launder delivering the pulp or feed mixture to feed pipe 38. 41 in Fig. 5 represents a bearing for the upper end of scraper shaft 33, and 42 a sprocket wheel for imparting rotary motion to said shaft. Shafts 33 may be supported in any convenient manner in the bottom of or beneath the tank.

The several scraper shafts 33 may be driven by means of an interlaced or other suitable chain, passing around suitably disposed guide pulleys, and around the sprocket wheels 42, fixed to the upper ends of the several shafts 33, or by means of shafts and bevel gears, or worms and worm wheels. Instead of providing one scraper on each shaft 33 for each settling plate 4 two or more may be fixed thereto, to work in conjunction with each or any slot 32. The scrapers 34 on each shaft 33 are preferably arranged in the same vertical plane (or planes, if more than one scraper is provided on the same shaft for each or any slot) as shown in Fig. 5 so as to simultaneously deliver the solids over the coincident slots 32 in all the plates. When the plates or settling surfaces 4 are inclined, then the scrapers and their driving gear will be correspondingly arranged.

What I claim as my invention and desire to protect by Letters Patent is:—

1. In means for separating pulverized ore or other comminuted solid matter from liquid, the combination with a vessel of a plurality of super-positioned settling plates or surfaces provided with coincident holes or passages for the settled solids from the top to the bottom of the vessel, and means for removing the settled solids off said settling plates or surfaces and delivering the same over said coincident holes or passages, as set forth.

2. In means for separating pulverized ore or other comminuted solid matter from liquid, the combination with a vessel of a plurality of super-positioned settling plates or surfaces having coincident holes or passages which form unobstructed passages for the settled solids from the top to the bottom of the vessel, and means for removing the settled solids off said settling plates or surfaces and simultaneously delivering the same over said coincident holes or passages, as set forth.

3. In means for separating pulverized ore or other comminuted solid matter from liquid, the combination with a vessel of a settling plate or surface provided with a hole or passage for the settled solids and in which said hole or passage gradually increases in width from its inner to its outer end, and means for removing the settled solids off said plate or surface and delivering the same over said hole or passage, as set forth.

4. In means for separating pulverized ore or other comminuted solid matter from liquid, the combination with a vessel of a plurality of settling plates or surfaces provided with holes or passages for the settled solids and in which said holes or passages gradually increase in width from their inner to their outer ends or from the center to the sides of the vessel, and means for removing the settled solids off said plates or surfaces and delivering the same over said holes or passages, as set forth.

5. In means for separating pulverized ore or other comminuted solid matter from liquid, the combination with a vessel of a plurality of super-positioned settling plates or surfaces having coincident holes or passages for the settled solids from the top to the bottom of the vessel, said holes or passages gradually increasing in width from their inner to their outer ends, and means for removing the settled solids off said settling plates or surfaces and for simultaneously delivering the same over said coincident holes or passages, as set forth.

6. In means for separating pulverized ore or other comminuted solid matter from liquid, the combination with a vessel of a plurality of super-positioned settling plates or surfaces having coincident holes or passages for the settled solids from the top to the bottom of the vessel, and in which the coincident holes or passages in the several tiers of settling plates are increased in width in each succeeding plate from the top to the bottom of the vessel, and means for removing the settled solids off said settling plates or surfaces and for delivering the same over said coincident holes or passages, as set forth.

7. In means for separating pulverized ore or other comminuted solid matter from liquid, the combination with a vessel of a plurality of super-positioned settling plates or surfaces having coincident holes or passages for the settled solids from the top to the bottom of the vessel, and in which the coincident holes or passages in the several tiers of settling plates are increased in width in each succeeding plate from the top to the bottom of the vessel, said holes or passages also gradually increasing in width from their inner to their outer ends, and means for removing the settled solids off said settling plates or surfaces and for simultaneously delivering the same over said coincident holes or passages, as set forth.

8. In means for separating pulverized ore or other comminuted solid matter from liquid, the combination with a vessel of a settling plate or surface having a hole or passage for the settled solids, and means for removing the settled solids off said plate or surface and delivering the same over said hole or passage, said means comprising a shaft and an arm fixed to said shaft, said arm moving in close proximity to the top of the said plate or surface, as set forth.

9. In means for separating pulverized ore or other comminuted solid matter from liquid, the combination with a vessel of a plurality of settling plates or surfaces having holes or passages for the settled solids, and means for removing the settled solids off said plates or surfaces and delivering the same over said holes or passages, said means comprising a shaft and an arm fixed to said shaft for each plate or surface, said arms moving in close proximity to the tops of their settling plates or surfaces, as set forth.

10. In means for separating pulverized ore or other comminuted solid matter from liquid, the combination with a vessel of a plurality of super-positioned settling plates or surfaces having coincident holes or passages for the settled solids from the top to the bottom of the vessel, and in which the coincident holes or passages in the several tiers of settling plates are increased in width in each succeeding plate from the top to the bottom of the vessel, said holes or passages also gradually increasing in width from their inner to their outer ends, and means for removing the settled solids off said settling plates or surfaces and for simultaneously delivering the same over said coincident holes or passages, said means comprising a shaft and an arm fixed to said shaft for each plate or surface, said arms moving in close proximity to the tops of their settling plates or surfaces, as set forth.

11. In means for separating pulverized ore or other comminuted solid matter from liquid, the combination with a vessel of settling plates or surfaces and carrier frames for said settling plates or surfaces, said carrier frames comprising side members providing between them holes or passages for the settled solids and constructed to be connected together at the center to mutually support each other at their inner ends and to be attached to the settling vessel at their outer extremities, and means for removing the settled solids off said plates or surfaces and delivering the same over said holes or passages, as set forth.

12. In means for separating pulverized ore or other comminuted solid matter from liquid, the combination with a vessel of settling plates or surfaces and carrier frames for said settling plates or surfaces, said carrier frames comprising side members providing between them holes or passages for the settled solids and constructed to be connected together at the center to mutually support each other at their inner ends and to be attached to the settling vessel at their outer extremities, and means for removing the settled solids off said plates or surfaces and delivering the same over said holes or passages, said means comprising a shaft and an arm fixed to said shaft for each plate or surface, said arms moving in close proximity to the tops of their settling plates or surfaces, as set forth.

13. In means for separating pulverized ore or other comminuted solid matter from liquid, the combination with a vessel of settling plates or surfaces and carrier frames for said settling plates or surfaces, said carrier frames comprising side members providing between them holes or passages for the settled solids and constructed to be connected together at the center to mutually support each other at their inner ends and to be attached to the settling vessel at their outer extremities, the side members of said carrier frames being made to diverge from their inner to their outer ends to gradually increase the width of the holes or passages formed between them from the center to the sides of the vessel, and means for removing the settled solids off said plates or surfaces and delivering the same over said holes or passages, as set forth.

14. In means for separating pulverized ore or other comminuted solid matter from liquid, the combination with a vessel of settling plates or surfaces and carrier frames for said settling plates or surfaces, said carrier frames comprising side members providing between them holes or passages for the settled solids and constructed to be connected together at the center to mutually support each other at their inner ends and to be attached to the settling vessel at their outer extremities, and cross members arranged between the side members of adjacent carrier frames for supporting the settling plates or surfaces between said frames, and means for removing the settled solids off said plates or surfaces and delivering the same over said holes or passages, as set forth.

15. In means for separating pulverized ore or other comminuted solid matter from liquid, the combination with a vessel of a plurality of super-positioned settling plates or surfaces having coincident holes or passages for the said settled solids from the top to the bottom of the vessel, means for removing the settled solids off said settling plates or surfaces and for delivering the same over said coincident holes or passages, said means comprising a shaft and an arm fixed to said shaft for each plate or surface, the arms moving in close proximity to the tops of their respective settling plates or surfaces, and a feed pipe arranged around the aforesaid shaft for the scraper arms, said feed pipe being constructed in a plurality of telescopic sections, said sections providing holes through which the scraper arms project, as set forth.

16. In means for separating pulverized ore or other comminuted solid matter from liquid, the combination with a vessel of a plurality of super-positioned settling plates or surfaces having coincident holes or passages for the settled solids from the top to the bottom of the vessel, means for removing the settled solids off said settling plates or surfaces and for delivering the same over said coincident holes or passages, said means comprising a shaft and an arm fixed to said shaft for each plate or surface, the arms moving in close proximity to the tops of their respective settling plates or surfaces, and the several arms being arranged in the same vertical plane so that they simultaneously deliver the solids over the coincident holes or passages, as set forth.

In testimony whereof I have signed my name to this specification in the presence of two subscribing witnesses.

ALEXANDER JOHN ARBUCKLE.

Witnesses:
CHAS. OVENDALE,.
W. S. AVES.